June 7, 1955 R. T. SIMPSON 2,710,074
GROUND ENGAGING VEHICLE BRAKE
Filed Feb. 26, 1954 2 Sheets-Sheet 1
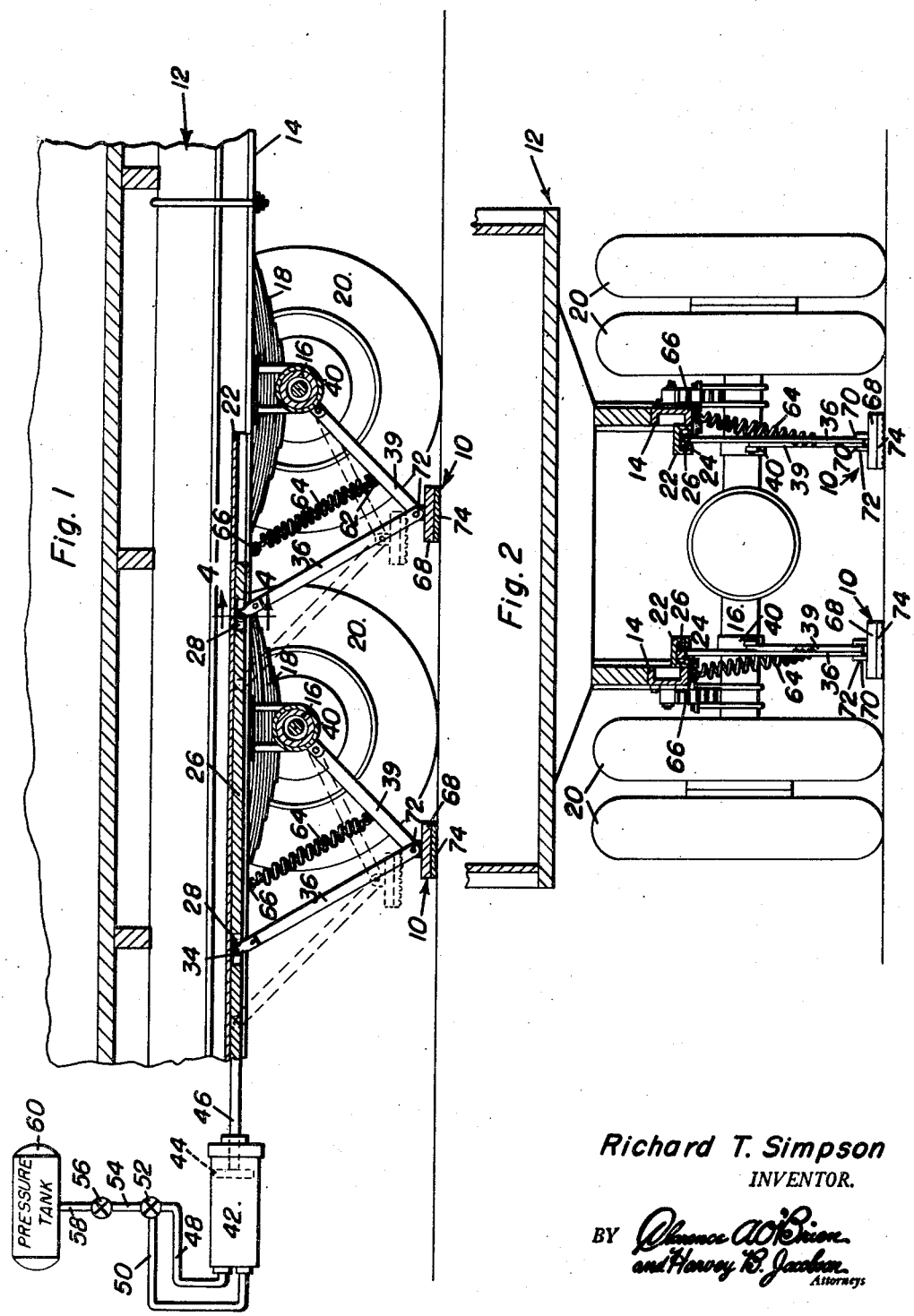
Richard T. Simpson
INVENTOR.

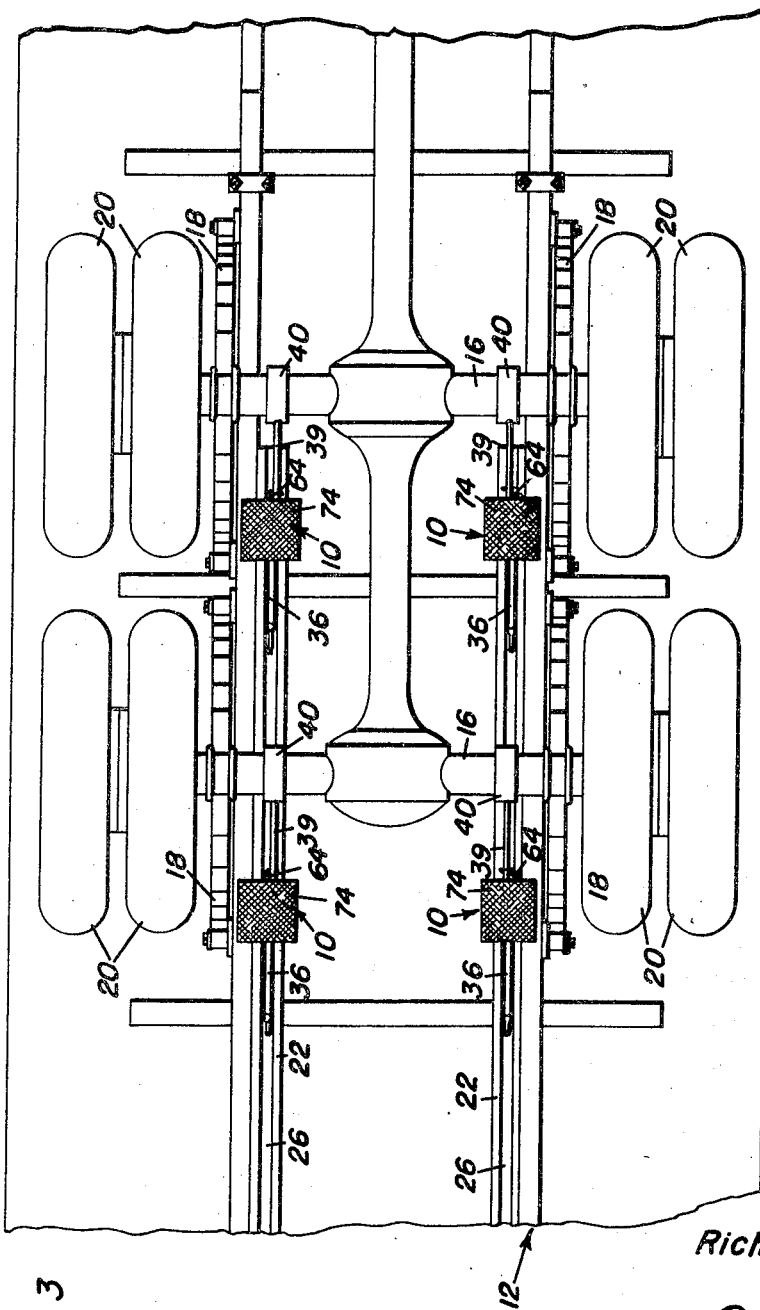
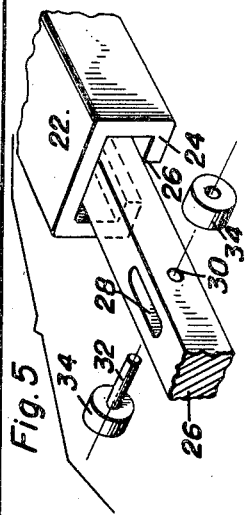
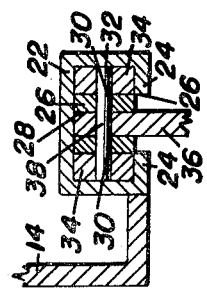
Richard T. Simpson
INVENTOR.

United States Patent Office 2,710,074
Patented June 7, 1955

2,710,074

GROUND ENGAGING VEHICLE BRAKE

Richard T. Simpson, Reno, Nev.

Application February 26, 1954, Serial No. 412,737

1 Claim. (Cl. 188—5)

This invention relates to a brake and more particularly to a brake which is adapted to be mounted on a vehicle and used as an emergency brake or in conjunction with the conventional brake of the vehicle.

An object of this invention is to provide a brake which can be attached to a vehicle and which brake will engage the surface over which the vehicle is travelling so as to prevent skidding or sliding of the vehicle during stopping.

Another object of this invention is to provide a brake for a vehicle having a positive actuator for urging the brake into ground engaging position.

A further object of this invention is to provide a brake having means normally maintaining the brake in inoperative position.

A still further object of this invention is to provide a brake which is simple and efficient in construction, durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view through a vehicle and showing the improved brake forming the subject of this invention mounted thereon;

Figure 2 is a rear elevational view of a vehicle showing the improved brake mounted thereon;

Figure 3 is a bottom plan view of a vehicle showing the brake mounted thereon;

Figure 4 is a sectional view taken substantially along the section line 4—4 of Figure 1; and Figure 5 is an exploded perspective view of the members shown in section in Figure 4.

Referring now particularly to the accompanying drawings it will be seen that the improved brake forming the subject of this invention includes, a brake shoe 10 adapted to be mounted on a vehicle 12 for movement into and out of ground engaging position.

In the drawings there is shown the brake in use with a tandem axle vehicle. The vehicle 12 is provided with longitudinally extending frame members 14 to which are secured a pair of parallel axle housings 16 by means of springs 18. A pair of wheels 20 are secured to each end of each of the axle housings 16. This is the conventional structure found in tandem axle vehicles.

A longitudinally extending channel member 22 is adapted to be secured on each of the longitudinally extending frame members 14 of the vehicle 12. The channel members 22 face downwardly and are provided with inturned flanges 24 at the lower ends of the legs thereof which flanges 24 define an opening 26 extending longitudinally of the channel members 22. An elongated member 26 is adapted to be positioned within each of the channel members 22 for sliding movement therein. Each of the members 26 is provided with a pair of vertically extending apertures 28 which are spaced from one another a distance equal to the distance between the axle housings 16. One of the apertures 28 is positioned rearwardly of the rearwardmost axle housing 16 and the other aperture 28 is adapted to be positioned between the axle housings 16. Intersecting the apertures 28 are aligned apertures 30. A pin 32 is adapted to be positioned within the apertures 30 and have portions thereof projecting from opposite sides of the member 26. Rollers 34 are positioned on the ends of the pins 32 which extend from opposite sides of the member 26. The rollers 34 are adapted to support the member 26 for sliding movement in the channels 22.

An arm 36 is provided with an aperture 38 at one end which arm is adapted to have the end thereof placed in the aperture 28 in member 26 with the pin 32 extending through the aperture 38. This forms a pivotal mounting for the arm 36. The brake shoe 10 is pivotally secured to the lower end of the arm 36. A second arm 39 is also pivotally connected to the brake shoe 10 and has the other end thereof pivotally connected to a collar 40 which is adapted to be secured to the axle housing 16. Thus, movement of the memer 26 longitudinally within the channel 22 will cause the brake shoe 10 to be moved into and out of ground engaging position.

Means are provided for urging the member 26 forwardly with respect to the frame members 14 in order to move the brake shoes 10 into ground engaging position. This means comprises a horizontally disposed hydraulic cylinder 42 which is adapted to be mounted in a suitable position on the frame 14 of the vehicle. A piston 44 is slidably disposed within the cylinder 42 for horizontal movement therein. The member 26 is provided with an extension 46 which is secured at one end to the piston 44. Suitable conduits 48 and 50 comprising inlet and exhaust lines are connected to one end of the cylinder and to a valve 52 for controlling the flow of pressure fluid through the lines 48 and 50. The valve 52 is connected by a conduit 54 to a suitable on-off control valve 56. The control valve 56 is in turn connected by a conduit 58 to a suitable source of pressure 60. Thus, by turning the valve 56 to on position and adjusting the valve 52 to allow the pressure to flow into the cylinder 42 through line 48 a piston 44 will be moved to the end of the cylinder forcing the member 26 forwardly on the frame 14 and consequently the brake shoes 10 into ground engaging position.

In order to return the brake shoes to an inoperative position the arms 39 are provided with projections 62 intermediate their ends and to which one end of a spring 64 is attached. The other end of the spring 64 is secured to a projection 66 on the frame member 14. Thus, when the valve 52 is moved to allow the pressure fluid to exhaust from the cylinder 42 through the line 50 the spring 64 will urge the arm 39 upwardly and in turn the brake shoe 10 will be moved to an inoperative position.

The brake shoe 10 may be formed of a metal plate 68 having a pair of spaced ears 70 extending upwardly from the upper surface thereof. The lower ends of the arms 36 and 39 are positioned between the ears 70 and suitable fastening means 72 extends through the ears 70 and the lower ends of the arms 36 and 39 for securing the same to the brake shoe 10. The lower surface of the plate 68 may be covered with any suitable material 74 for providing a better frictional gripping of the plate 68 with the surface over which the vehicle is travelling.

In practical use of the device, after the channel 22 and member 26 and arms 36 and 39 have been attached to the vehicle and the member 26 connected to the cylinder 42, when it is desired to stop the vehicle the valve 56 will be moved to an on position and the valve 52 will be moved to the position wherein pressure fluid will flow through the line 48 onto the cylinder. This will cause the brake shoes 10 to be depressed into ground engaging position and the forward momentum of the vehicle will be stopped.

The load of the vehicle will aid in pressing the brake shoes 10 into engagement with the ground. Then, when it is desired to release the brake shoes 10 the valve 52 will be turned to a position allowing the exhaust of the pressure fluid from the cylinder 42 through the line 50. The spring 64 will then raise the arms 39 and the brake shoes 10. This brake can be used as an emergency brake upon the failure of the regular brakes of the vehicle or can be used in conjunction therewith or alternatively to reduce the wear on the regular brakes of the vehicle.

From the foregoing the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A ground brake comprising a ground engaging brake shoe, a downwardly opening channel member adapted to be mounted horizontally on a chassis frame of an automobile and having inturned bottom flanges, an elongated horizontal member in said chanel member provided with rollers rolling on said flanges and supporting said elongated member for longitudinal movement in said channel member, a fluid pressure cylinder adapted to be mounted on a chassis frame, said cylinder being aligned with said elongated member and having a piston therein fixed on said elongated member and responsive to pressure in the cylinder to move said elongated member, and means for engaging said shoe with the ground upon movement of said elongated member comprising a pair of downwardly converging arms having lower ends pivoted together and to said shoe, one of said arms having an upper end pivoted to said elongated member, the other arm having an upper end provided with a collar pivoted thereto and attachable to an axle housing of an automobile.

References Cited in the file of this patent
UNITED STATES PATENTS

| | | |
|---|---|---|
| 977,631 | Hopper | Dec. 6, 1910 |
| 1,116,546 | Bauer | Nov. 10, 1914 |
| 1,212,781 | Luce | Jan. 16, 1917 |
| 1,282,054 | Dorohon | Oct. 22, 1918 |
| 1,455,576 | Elliott | May 15, 1923 |
| 2,147,451 | Messina | Feb. 14, 1939 |

FOREIGN PATENTS

| | | |
|---|---|---|
| 23,131 | Great Britain | Oct. 18, 1906 |